(12) United States Patent
Bergman

(10) Patent No.: US 8,788,195 B2
(45) Date of Patent: *Jul. 22, 2014

(54) SYSTEM AND METHOD FOR OBTAINING MAP COORDINATES TO FIXED LOCATION

(75) Inventor: Avi Bergman, Carlsbad, CA (US)

(73) Assignees: Avi Bergman, Carlsbad, CA (US); John L. Rogitz, San Diego, CA (US), part interest ( * ) Notice: Subject to any disclaimer, the term of this patent is extended or adjusted under 35 U.S.C. 154(b) by 266 days.

This patent is subject to a terminal disclaimer.

(21) Appl. No.: 13/293,328

(22) Filed: Nov. 10, 2011

(65) Prior Publication Data

US 2012/0071143 A1   Mar. 22, 2012

Related U.S. Application Data

(63) Continuation-in-part of application No. 13/184,519, filed on Jul. 16, 2011, now Pat. No. 8,145,422, which is a continuation of application No. 11/801,654, filed on May 10, 2007, now Pat. No. 7,996,148.

(51) Int. Cl.
    *G01C 21/34*  (2006.01)
    *G01C 21/36*  (2006.01)
    *H04M 1/725*  (2006.01)
    *H04M 1/60*   (2006.01)

(52) U.S. Cl.
    CPC ........ *H04M 1/7253* (2013.01); *H04M 2250/10* (2013.01); *H04M 1/72544* (2013.01); *G01C 21/362* (2013.01); *H04M 1/6091* (2013.01)
    USPC ......................................... 701/425; 455/517

(58) Field of Classification Search
    USPC .......... 701/400, 408–410, 425, 426; 342/367, 342/377, 419, 461, 462; 455/404.2, 403, 455/517, 445, 412.1, 422, 456.1–456.6, 455/414.1–414.4
    See application file for complete search history.

(56) References Cited

U.S. PATENT DOCUMENTS

| | | | | |
|---|---|---|---|---|
| 5,684,859 A | * | 11/1997 | Chanroo et al. | 455/433 |
| 7,860,485 B2 | * | 12/2010 | Moore et al. | 455/410 |
| 2013/0030694 A1 | * | 1/2013 | Nortrup | 701/410 |

\* cited by examiner

*Primary Examiner* — Dalena Tran
(74) *Attorney, Agent, or Firm* — John L. Rogitz

(57) ABSTRACT

A method for obtaining directions to fixed location such as a restaurant includes using a telephone to call a 411 directory, and providing a prompt to the caller during the 411 call to push a button on the telephone to download the GPS location of the restaurant. The GPS information is transferred from the telephone to a navigation module in a vehicle which displays a map showing the route to the restaurant. Or, the GPS location may be obtained from an Internet server associated with the fixed location.

9 Claims, 4 Drawing Sheets

SYSTEM AND METHOD FOR OBTAINING MAP COORDINATES TO FIXED LOCATION

This is a continuation-in-part of U.S. patent application Ser. No. 11/801,654, filed May 10, 2007, now U.S. Pat. No. 7,996,148 incorporated herein by reference and from which priority is claimed.

FIELD OF THE INVENTION

The present invention is directed to systems and methods for obtaining map coordinates to fixed locations, such as restaurants.

BACKGROUND OF THE INVENTION

Subscription services have been introduced to provide cellular telephone users with location information to service providers such as restaurants on a subscription basis. An example of such a system is disclosed in Japanese patent publication JP2003075189.

As understood herein, from the service provider's viewpoint it might be less than optimum to leave to the tender mercies of a wireless carrier subscription service the transferring of map information to a patron searching for the location of the service provider. Accordingly, the invention, herein is provided.

SUMMARY OF THE INVENTION

A method for obtaining directions to fixed location includes, during a call from a telephone to a number of a telephone system directory such as a 411 directory, providing from the telephone system directory to the telephone an automated prompt to a caller using the telephone to push a particular button on the telephone in response to the prompt to download a navigation code from the telephone system directory. The code includes geographic information associated with the fixed location, such as the GPS coordinates of the fixed location. The method includes transferring the code downloaded in response to the prompt from the telephone to a navigation module. The navigation module can then be used to display directions to the fixed location.

The telephone may communicate with the navigation module such that the code from the fixed location is automatically provided by the telephone to the navigation module. The navigation module can be in a vehicle or in the telephone.

Prior to providing the automated prompt to the caller during the call to push a particular button on the telephone in response to the prompt to download a navigation code from the telephone system directory, the method can include prompting the caller to input a name of a desired called party.

In another aspect, a wireless telephone system includes a wireless telephony transceiver, a telephone processor communicating with the transceiver, and a key entry input device communicating with the processor. A user of the system can call a 411 directory service and in response to an automated prompt enter a particular selection from the key entry input device into the processor for transmission of the selection from the key entry input device to the 411 directory service. The transceiver receives back from the 411 directory service in response to the prompt geographic location data of a fixed location. The processor causes directions to the fixed location to be displayed in response to the data downloaded in response to the prompt.

In another aspect, a 411 directory server includes a processor receiving telephone calls and a computer readable storage medium accessible to the processor and bearing instructions to cause the processor to, after prompting a caller for a name of a desired fixed location, provide an automatic prompt to select to have a navigation code representing a geographic location of the fixed location downloaded over a telephony network to a calling telephone in response to at least one automatic prompt being selected.

In another aspect, a system for obtaining directions to fixed location includes a computerized accessing component such as a personal computer or wireless telephone, and a web server sending a user interface (UI) to the accessing component. The UI includes at least one selector element selectable to cause geographic information, such as GPS, coordinates, representing a geographic location of a fixed location to be downloaded from the web server to the accessing component. The geographic information is used by the accessing component or by an affiliated component obtaining the geographic information from the accessing component to present a visual map on a display indicating a route and/or directions to the fixed location from a current location.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
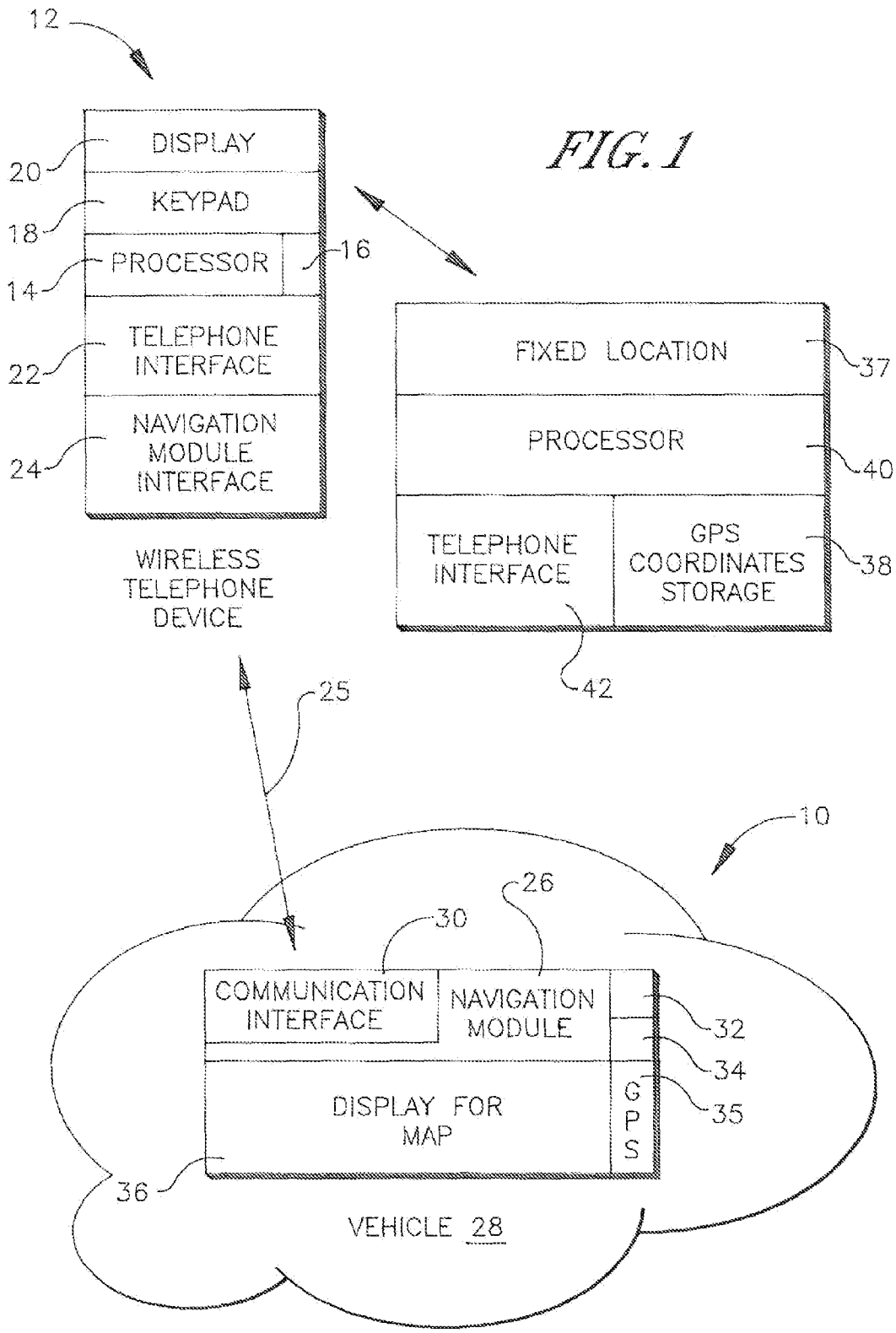
FIG. 1 is a block diagram of a preferred non-limiting system in accordance with present principles.

Referring initially to FIG. 1, a system is shown, generally designated 10, which includes wireless modules such as a portable wireless telephone 12 having a telephone processor 14 accessing a computer readable medium 16 that stores logic for executing various methods discussed herein. The telephone processor 14 may receive input from a keypad 18 and may output text, numbers, and video information on a telephone display 20. The wireless telephone 12 may send and receive information using a wireless telephony interface 22 that may employ, without limitation, code division multiple access (CDMA), global system for mobile communication (GSM), time division multiple access (TDMA), wideband CDMA (W-CDMA), space division multiple access (SDMA), frequency division multiple access (FDMA), and orthogonal frequency division multiplexing (OFDM) principles known in the art to effect wireless communication.

Additionally, in some implementations the wireless telephone 12 may include a navigation module interface 24 for communicating, via a wired or wireless link 25, with a navigation module 26 mounted in a vehicle 28. Specifically, the telephone navigation module interface 24 communicates over the link 25 with a complementarily-configured navigation module communication interface 30. The navigation module 26 may contain a module processor 32 accessing a computer readable medium 34 that stores computer code embodying logic discussed herein to present map information on a navigation module display 36. The various computer readable media disclosed herein may be solid state media, disk-based media, or other appropriate media, fixed or removable in their respective components.

The link 25 may be a wired link such as but not limited to a universal serial bus (USB) link or an Ethernet link. Or, the link 25 may be a wireless link such as a Bluetooth link, a near field communication (NFC) link, a personal, area network (PAN) link, or even a telephony link, in which latter case the navigability module interface 24 of the wireless telephone 12 may be omitted and the wireless telephony interface 22 used in its place. In any case, the telephone and module communication interfaces 24, 30 are structured according to the type of link being used. The navigation module 26 may include a GPS receiver 35 for receiving GPS location information pertaining to the location of the vehicle. The telephone 12 likewise may include a GPS receiver if desired.

In accordance with disclosure below, the telephone 12 can communicate via a wireless telephony network with one or more fixed locations 37 such as, e.g., restaurants or other public service providers or indeed with private dwellings implementing the invention herein. The fixed location 37 is geographically fixed, and its geographic location may be stored on a computer readable medium 38 in the form of, e.g., global positioning satellite (GPS) location, such that a fixed location processor 40 can communicate the location information via a telephony interface 42 that is associated with the fixed location to the telephone 12. The telephony interface 42 may be part of a telephone answering system that can include automatic menu prompts in accordance with disclosure below.

Figure 2:
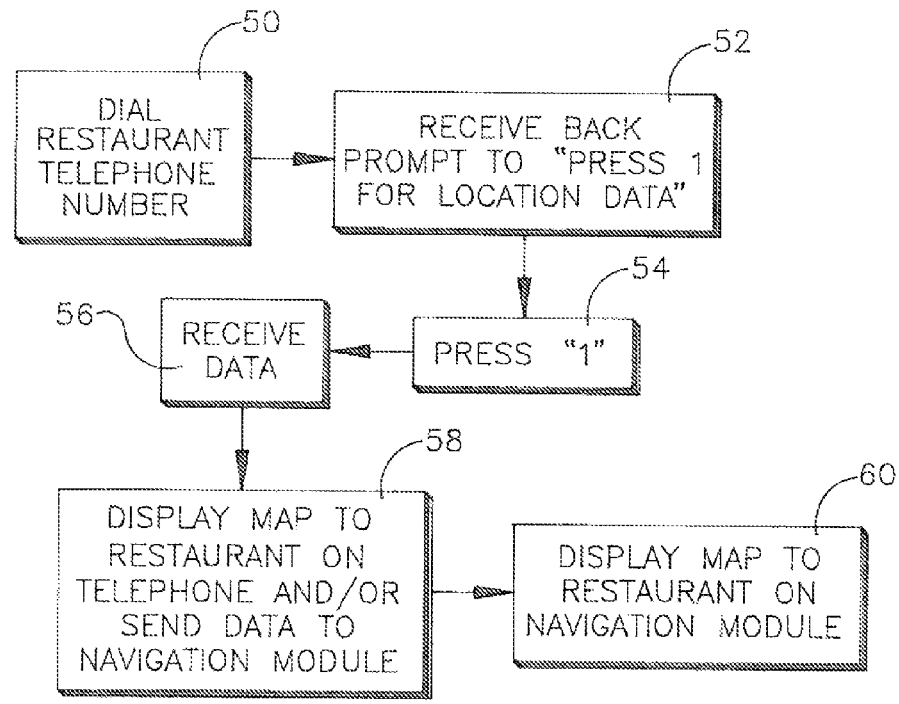
FIG. 2 is a flow chart of example logic in accordance with present principles.

Turning now to FIG. 2, commencing at block 50 a person who typically would be an occupant of the vehicle 28 uses the telephone 12 to call the telephone number of the fixed location 37, which for illustration will be referred to as a "restaurant" in the following discussion. When the connection is made, the restaurant processor 40 causes an automatic menu prompt routine to be transmitted to the telephone 12, with the menu prompt routine including a prompt for obtaining geographic location data. For example, the restaurant can prompt the telephone user to "press one for GPS location data."

At block 54, the user can press "1" on the telephone keypad 18, which is transmitted back to the restaurant to cause the restaurant processor 40 to automatically download the GPS location of the restaurant, usually in the form of a navigation code representing latitude and longitude, to the telephone 12. The data is received by the telephone 12 at block 56, and in some implementations at block 58 the logic of the telephone 12 can access the telephone's GPS location and map data that may be stored on, e.g., the medium 16 (in essence, a navigation module within the telephone 12) to cause a map or other directions such as text directions or aural instructions (e.g., "turn fight at the next light") to be displayed. Visual directions may be displayed on the telephone display 20 showing the route from the current location of the telephone 12 to the restaurant. According to present principles, the map is derived using, as starting location, the telephone's GPS location and as end destination, the GPS information received from the restaurant.

More preferably, in addition to or in lieu of presenting the map on the telephone, at block 58 the restaurant location data is automatically sent from the telephone 12 to the vehicle navigation module 26 over the link 25 at block 58. Consequently, at block 60 the logic of the navigation module 26 can access the vehicle's GPS location from the GPS receiver 35 and map data that may be stored on, e.g., the medium 34 to cause a map or other directions to be displayed on the navigation module display 36 of the route from the current location of the vehicle 28 to the restaurant. In addition or alternatively the module 26 may display aural directions. According to present principles, the map is derived using, as starting location, the vehicle's GPS location and as end destination, the GPS information received from the restaurant.

Figure 3:
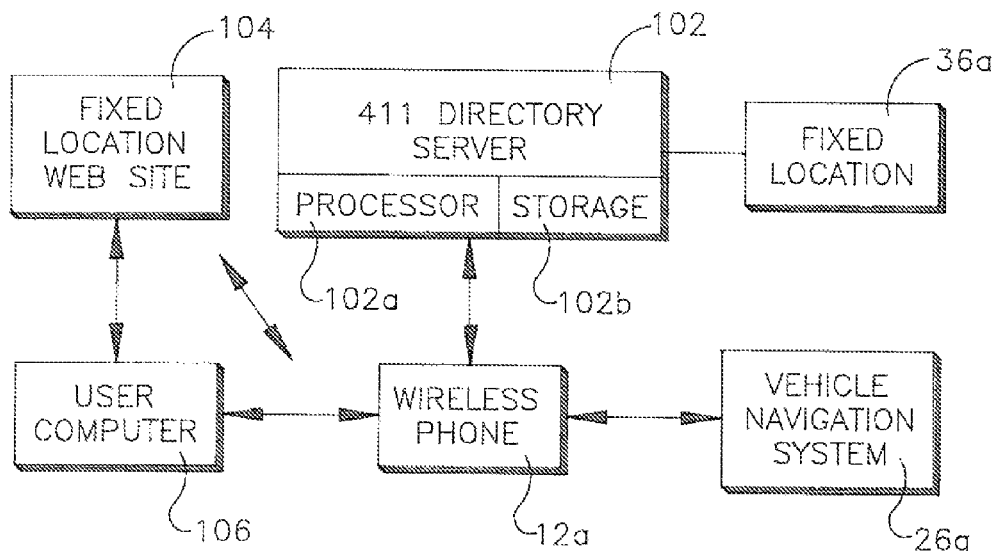
FIG. 3 is a block diagram of an alternate system.

FIG. 3 shows another example system, generally designated 100, which may include a wireless telephone device 12a, a vehicle navigation system 26a, and a fixed location 36a with computer components. The components 12a, 26a, 36a shown in FIG. 3 may be substantially identical in configuration to the corresponding components 12, 26, 37 shown in FIG. 1. Additionally, in FIG. 3 the wireless telephony device 12a may communicate over a wireless telephony network with a telephone system directory server or service 102 such as a 411-type directory service in which a user of the telephone 12a may dial 411 to connect with the information server 102 hosting a directory information service. The server 102 may include one or more processors 102a and one or more computer readable storage media 102b.

In some implementations the system 100 may further include a web site 104 typically hosted on a computerized web server, with the web site 104 being associated with the fixed location 36a. A user computer 106 may also be provided in some embodiments for purposes to be shortly disclosed, and the user computer may communicate with the wireless telephony device 12a. Both the wireless telephony device 12a and user computer 106 may communicate with the web site 104. The various communication links may be wired or wireless.

Figure 4:
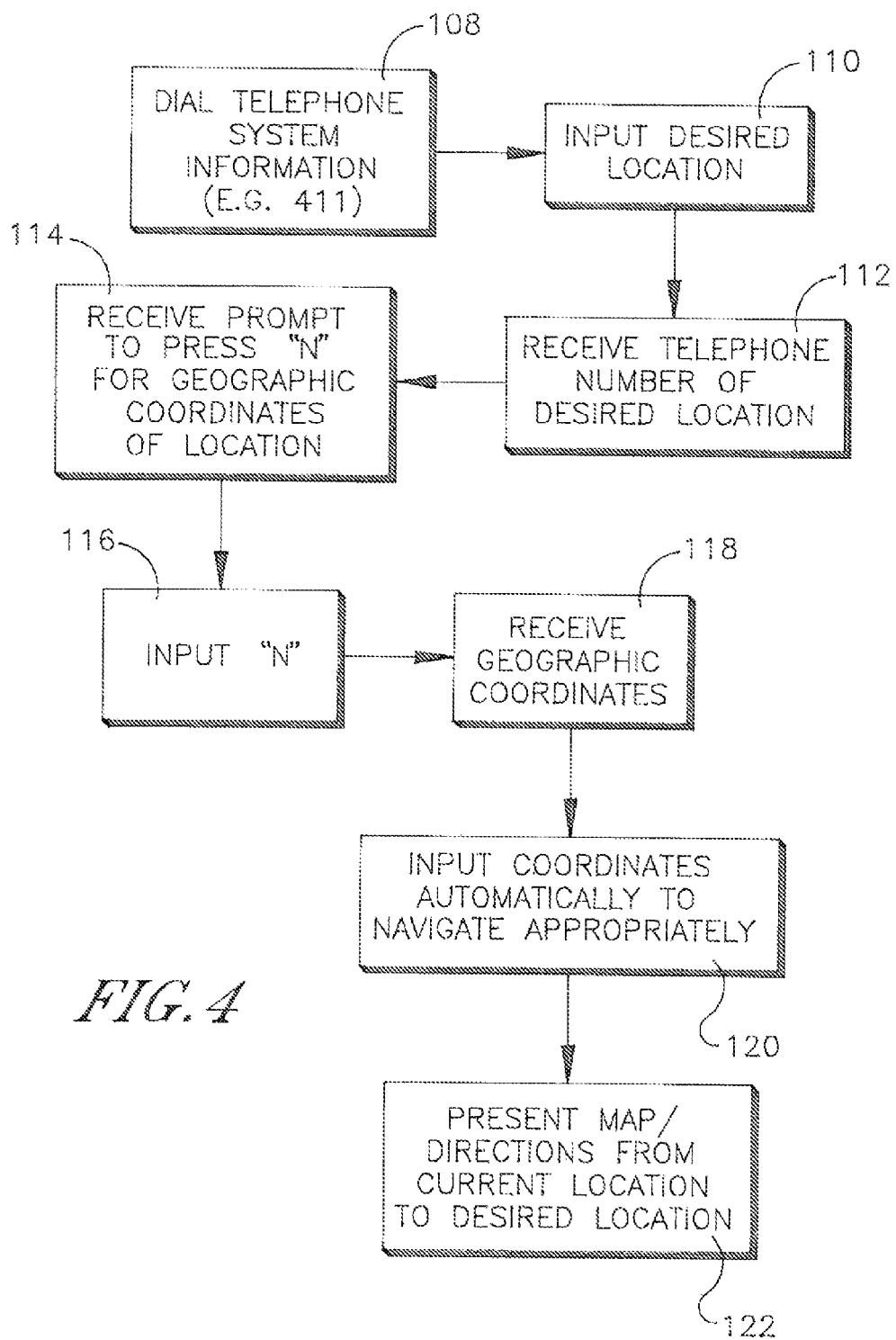
FIG. 4 is a flow chart of alternate logic in which the geographic information of a desired location is received from a telephone system information line.

Refer now to FIG. 4, which illustrates logic commencing at block 108, in which the wireless telephony device 12a dials a telephone system information number, typically 411 in the United States. After connecting to the information number and typically responsive to a voice prompt therefrom, the user of the wireless telephony device 12a speaks or types using the telephone keypad or otherwise inputs the identification of the fixed location 36a at block 110, ordinarily by speaking the name of the location 36a. If desired, the directory server 102 then returns the telephone number of the location which is received by the wireless telephony device 12a at block 112, although in some embodiments the logic may skip block 112 and proceed directly to block 114.

Proceeding to block 114, regardless of whether the telephone number of the location is returned, the directory service/server then issues an audible voice prompt to select to have the geographic location or coordinates of the location 36a downloaded, which prompt is received by the wireless telephony device 12a at block 114. In one example, the voice prompt is to press a particular number key on the wireless telephony device 12a (for generality, designated key "N" in FIG. 4) to receive the geographic coordinates of the location 36a. The geographic coordinates may be GPS coordinates. It is to be understood that to this end, the directory server 102 includes a database that, correlates telephone numbers to geographic locations such as geographic coordinates, and this database may be developed by receiving the geographic coordinates from the various entities whose telephone numbers are listed in the directory.

For example, the geographic location of the location 36a, such GPS coordinates of the location 36a, may be received by the directory server 102 from the website or web server 104 associated with the location 36a. This may be done automatically by, e.g., the directory server 102 employing a web crawler to access websites associated with entities listed in the directory and obtaining geographic information therefrom, such as GPS coordinates or street addresses which can then be correlated to GPS coordinates by the server 102. Or, the telephone carrier may provide the option for entities listed in its directory to provide their geographic information to the directory service for a fee, or for free.

In any case, assume the user desires to receive the geographic information of the location 36a. In this case, input of the prompted key ("N" in the example shown) is received by the wireless telephony device 12a at block 116 and sent to the directory service or server 102, which in response sends the geographic information (e.g., GPS coordinates or street address that can be correlated to a map position) to the wireless telephony device 12a. The geographic information is received at block 118 and at block 120 the information may be input automatically without further user interaction to a navigation module in the wireless telephony device 12a for display at block 122 of a map and/or driving directions from the current location of the wireless telephony device 12a to the position of the location 36a, either on the wireless telephony device 12a and/or navigation display of the vehicle navigation module 26a in accordance with previous disclosure.

Figure 5:
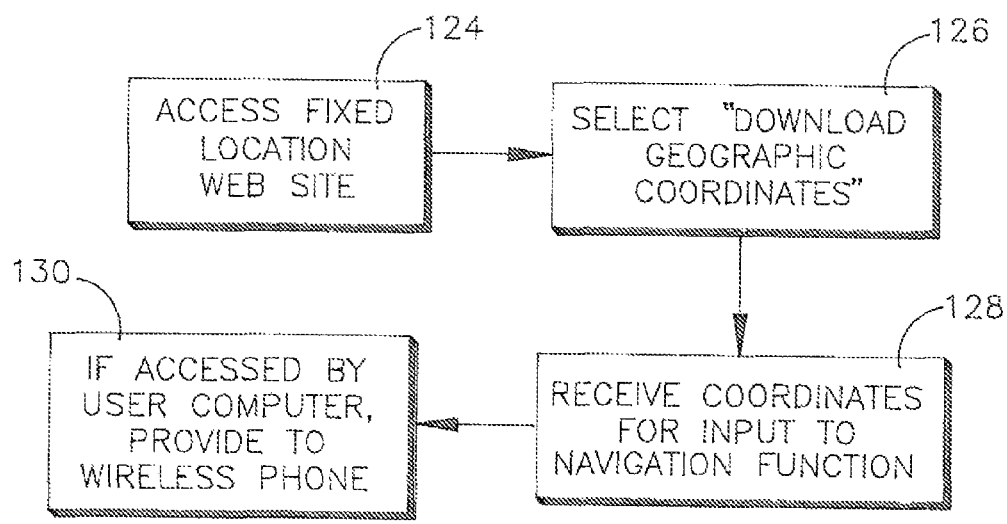
FIG. 5 is a flow chart of alternate logic in which the geographic information of a desired location is received from a website associated with the location.
Figure 6:
FIG. 6 is a screen shot of an example user interface that can be used in conjunction with the logic of FIG. 5.

FIGS. 5 and 6 show that as an alternative to obtaining the geographic information of the fixed location from the fixed location or from a 411 directory, the geographic information of the fixed location may be obtained from the web site or server 104 associated with the fixed location, whether using the wireless telephony device 12a or using the user computer 106 shown in FIG. 3. Commencing at block 124, the wireless telephony device 12a or user computer 106 accesses the web site or server 104 and at block 126 the user selects to download the geographic information of the location 36a, typically, by clicking a selector element on a user interface (UI) presented on the display of the accessing device. An example UI is discussed further below. Responsive to the selection the geographic information of the fixed location is received from the web site or server 104 by the accessing component at block 128 for automatic input into the navigation function or module of the wireless telephony device 12a and/or vehicle 26a according to principles above. That is, upon receipt of the information the wireless telephony device 12a automatically inputs it to a navigation module which in turn can automatically present a map and/or directions from the current location of the wireless telephony device 12a to the position of the location 36a.

In the event that the user computer 106 is used to access the geographic information of the fixed location from the web site or server 104, the logic may continue to block 130 to transfer the information from the user computer 106 to the wireless telephony device 12a. The GPS coordinates can be immediately and automatically transferred, from the computer 106 to the wireless telephony device 12a over a wired or wireless link, or they can be accessed at a later time for transmission to the cell phone. In the former case, the geographic information can be automatically transferred using, e.g., Bluetooth as soon as the user computer 106 receives the information from the web. Later access can be accomplished by commands directly on the computer or by remote access via the wireless telephony device 12a. For example, the user of the wireless telephony device 12a can log in to an email account using the wireless telephony device 12a and download GPS coordinates embedded in an email sent to the account by the user computer 106. Or, the wireless telephony device 12a can remotely access the computer 106 directly via the Internet and download GPS coordinates saved in computer. Other means of transferring the geographic information from the computer 106 to the wireless telephony device 12a may be used.

Once the GPS information is received by the wireless telephony device 12a, it is processed according to disclosure above.

While the particular SYSTEM AND METHOD FOR OBTAINING MAP COORDINATES TO FIXED LOCATION is herein shown and described in detail, it is to be understood that the subject matter which is encompassed by the present invention is limited only by the claims.

What is claimed is:

1. A method for obtaining directions to fixed location, comprising:
   during a call from a telephone to a number of a telephone system directory, receiving from the telephone system directory at the telephone an automated prompt to a caller using the telephone to push a particular button on the telephone in response to the prompt to download a navigation code from the telephone system directory, the code including a street address and/or a global positioning satellite (GPS) location associated with the fixed location;
   receiving the code downloaded in response to the prompt at the telephone;
   automatically providing the code to a navigation module in the telephone or in a vehicle in which the telephone is disposed such that the navigation module determines a map and/or directions from the telephone to the fixed location using the code and a GPS location of the telephone received by a GPS receiver on the telephone or in the vehicle, the navigation module being used to display the map and/or directions to the fixed location.

2. The method of claim 1, wherein the navigation module is in the vehicle.

3. The method of claim 1, wherein the navigation module is in the telephone.

4. The method of claim 1, wherein the number of the telephone system directory called by the telephone is 411.

5. The method of claim 1, wherein prior to receiving the automated prompt to the caller during the call to push a particular button on the telephone in response to the prompt to download a navigation code from the telephone system directory, the method includes receiving a prompt prompting the caller using the telephone to input a name of a desired party.

6. A wireless telephone system comprising:
   at least one wireless telephony transceiver;
   at least one telephone processor configured for communicating with the transceiver;
   at least one key entry input device configured for communicating with the processor; and
   at least one computer readable storage medium storing instructions executable by the processor which when executed by the processor configure the processor for:
   calling a 411 directory service;
   receiving a prompt to enter a particular selection from the key entry input device;
   transmitting a selection made from the key entry input device responsive to the prompt;
   receiving back in response to transmitting the selection made from the key entry input device responsive to the prompt geographic location data of a fixed location;
   using the geographic location data of the fixed location and location information of the system received from a satellite by the system, determining a map and/or directions from the system to the fixed location; and causing the map and/or directions to the fixed location to be displayed in response to data downloaded in response to the prompt.

7. The system of claim 6, wherein the system includes a portable wireless telephone containing the transceiver, processor, and input device.

8. The system of claim 7, wherein the portable wireless telephone includes a display on which the processor causes to be displayed the directions to the fixed location.

9. The system of claim 7, wherein the portable wireless telephone includes a communication interface communicating with a navigation module in a vehicle, the navigation module having a display on which is caused to be displayed the directions to the fixed location.

* * * * *